March 28, 1939. C. STANSBURY 2,152,608
CONTROLLER FOR ELECTRIC WELDER AND OTHER CIRCUITS
Original Filed May 2, 1935
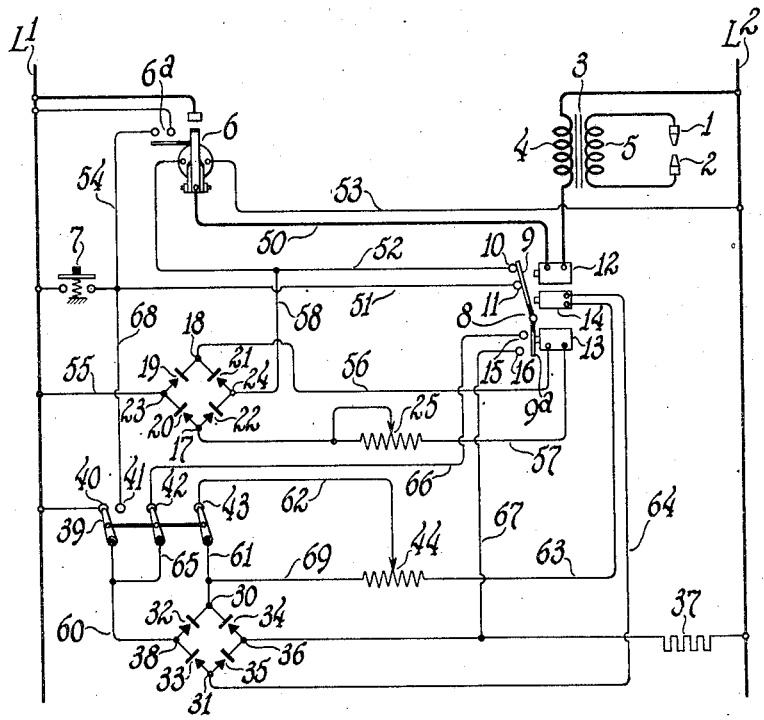
Inventor
Carroll Stansbury
By Frank W Hubbard
Attorney Patented Mar. 28, 1939

2,152,608

UNITED STATES PATENT OFFICE 2,152,608

CONTROLLER FOR ELECTRIC WELDER AND OTHER CIRCUITS

Carroll Stansbury, Wauwatosa, Wis., assignor to Cutler-Hammer, Inc., Milwaukee, Wis., a corporation of Delaware Continuation of application Serial No. 19,405, May 2, 1935. This application January 13, 1936, Serial No. 58,789

9 Claims. (Cl. 175—320)

This invention relates to improvements in controllers for electric circuits, controllers embodying the invention being particularly advantageous for electric welders.

This application is a continuation of my copending application Serial No. 19,405, filed May 2, 1935, and is particularly directed to that type of control affording repetition automatically of a circuit commutating cycle.

An object of the invention is to provide a controller of the aforementioned character having simple and reliable means whereby for example, the circuit will be closed, then opened after lapse of a given time, and then reclosed, but only after lapse of a given time following circuit opening.

Another object is to provide a controller which may be caused to function as stated, or alternatively to function for only one cycle and then stop pending a manual operation.

Other objects and advantages of the invention will hereinafter appear.

The accompanying drawing illustrates only a single embodiment of the invention, but it is to be understood that the invention may be embodied in other forms without departing from the scope of the appended claims.

Referring to the drawing, it shows diagrammatically a welder comprising welding jaws 1 and 2 to be supplied with current by a transformer 3, this transformer having a primary winding 4 and a secondary winding 5, the latter being connected to the jaws 1 and 2. The primary winding of the transformer is supplied with current from A. C. supply lines $L^1$—$L^2$ through an electromagnetic contactor 6 which is biased to open position and which is to be energized in response to closure of a manual push button switch 7 to complete the welder circuit and to be deenergized to interrupt the welder circuit after lapse of a given time.

The timing means comprises an electroresponsive relay 8 having a pivoted armature 9 normally bridging contacts 10 and 11 in circuit with the winding of contactor 6, said relay having a winding 12 permanently included in the welder circuit to attract the armature away from said contacts, and a winding 13 to coact with an extension 9ª of its armature to hold the armature against attraction by the winding 12 while the winding 13 exerts a given magnetic pull. Also relay 8 has a winding 14 to hold its armature 9 in attracted position, and said relay has an additional pair of contacts 15 and 16 which are normally unbridged but adapted to be bridged by the armature extension 9ª when the armature is attracted by the winding 12. The armature 9 and its extension 9ª are insulated one from the other.

The restraining winding 13 is connected to points 17 and 18 of a closed loop containing rectifier elements 19, 20, 21 and 22, said loop being connected at a point 23 to line $L^1$ and at a point 24 to line $L^2$ through the winding of contactor 6. The rectifier elements which may be of the copper oxide type or other preferred type, are so arranged as to rectify the alternating current supplied to the loop whereby the relay winding 13 is supplied with unidirectional current. Although the current supplied to the rectifier loop traverses the winding of contactor 6 the rectifier elements place the winding 13 in series with the contactor winding and the inductance of winding 13 is utilized to reduce the current flow through the contactor winding to a degree rendering it incapable of operating the contactor or holding it closed. The circuit of winding 13 has included therein an adjustable rheostat 25 for a purpose hereinafter set forth.

As the winding 12 of relay 8 is included in the welder circuit said relay of course has no tendency to respond until the contactor 6 responds, response of the contactor being effected by closure of push button switch 7. The winding 13, however, is energized as aforestated through the rectifier loop without dependence upon any switch, wherefore it is effective for restraint of relay 8 when a welding cycle is initiated by depression of the push button switch 7. On the other hand, when push button switch 7 is operated to initiate a welding cycle it additionally establishes a connection from line $L^1$ through the contacts 10 and 11 of relay 8 to the rectifier loop at point 24, resulting in short-circuit of the loop and connection of the relay winding 13 in a closed discharge loop. Thus the restraining magnetic pull of winding 13 gradually decreases, the rate of decay of its magnetic flux being variable by the adjustable rheostat 25, and after a lapse of time determined by the adjustment of said rheostat and the value of welder current traversing winding 12 relay 8 responds to deenergize contactor 6 for interruption of the welder circuit.

The holding winding 14 of relay 8 is connected to points 30 and 31 of a second rectifier loop containing rectifier elements 32, 33, 34 and 35. This rectifier loop has a connection from point 36 through a resistance 37 to line $L^2$ and a connection from a point 38 through a switch 39 to line $L^1$. The switch 39 is of the double throw type having stationary contacts 40 and 41 to be engaged selectively, the former to be engaged to complete the rectifier loop circuit just mentioned, and this switch forms part of a selector device having in addition single throw switches 42 and 43. The switch 42 is included in a circuit extending from point 38 through said switch and relay contacts 15 and 16 when bridged to the rectifier loop at point 36, while switch 43 is connected between point 30 of the rectifier loop and the slider of an adjustable rheostat 44 in circuit between point 30 and one terminal of the holding winding 14 of relay 8.

Thus with switch 39 in the position illustrated the second rectifier loop is connected across lines $L^1$ and $L^2$ to supply rectified current to the relay winding 14, rendering the latter effective for holding relay 8 in the position wherein it deenergizes contactor 6 to interrupt the welding circuit, at the same time disconnecting its own operating winding 12. However, response of relay 8 to effect interruption of the welder circuit additionally bridges contacts 15 and 16 which shortcircuits the second rectifier loop and establishes a discharge circuit for the holding winding 14. Consequently the holding pull of winding 14 gradually decreases, the rate of decay of its magnetic flux being variable by the adjustable rheostat 44 and after a lapse of time determined by the adjustment of said rheostat winding 14 releases relay 8 for automatically repeating the welder cycle, assuming push button switch 7 to be held depressed.

When the selector device is shifted to engage contact arm 39 with contact 41 and to open switches 42 and 43 automatic repetition of the welding cycle is prevented. Under such conditions the rectifier loop supplying the holding winding is normally disconnected from line $L^1$ but is adapted to be connected to line $L^1$ by closure of the push button switch 7, this line connection being thereafter maintained so long as either push button switch 7 is held closed or contactor 6 remains closed to bridge its auxiliary contacts $6^a$. In this case no provision is made for shortcircuiting the second rectifier loop and accordingly the winding 14 when energized remains energized to hold the relay 8 against release pending release of both the push button switch 7 and the contactor 6. Thereupon relay 8 is released to enable initiation of another welding cycle by depression of the push button switch 7. When the rectifier loop supplying the holding winding 14 is disconnected from circuit the winding discharges through a closed loop including the rectifier loop and the entire resistor of rheostat 44 and as the result of including said resistor the holding winding 14 discharges rapidly for quick release of relay 8.

Tracing the circuits illustrated, the controlled welder circuit extends from line $L^1$ to and through contactor 6 by conductor 50 to and through winding 12 of relay 8, and thence to and through the primary winding 4 of transformer 3 to line $L^2$. Thus as aforesaid the operating winding 12 of relay 8 is subject to influence by the value of the welder current, and as will be understood the welding period will be varied approximately inversely of the welder current.

The energizing circuit of contactor 6 extends from line $L^1$ through push button switch 7 by conductor 51 through relay contacts 11—10 by conductor 52 through the contactor winding, by conductor 53 to line $L^2$. In this connection it will be noted that the push button switch 7 is ineffective to energize contactor 6 unless relay 12 is released to bridge contacts 10 and 11, or in other words unless said contactor is in a given position. When the contactor 6 responds it completes through its auxiliary contacts $6^a$ a maintaining circuit for itself. This maintaining circuit extends from line $L^1$ through contacts $6^a$ by conductor 54 to conductor 51 and thence through the relay contacts and the contactor winding to line $L^2$ as already traced. Thus both the energizing and maintaining circuits of contactor 6 are dependent upon bridging of relay contacts 10 and 11, and accordingly upon response of said relay when it is released by the winding 13 as hereinbefore described the contactor 6 will open to interrupt the welder circuit.

The energizing circuit for the restraining winding 13 extends from line $L^1$ by conductor 55 to point 23 of the upper rectifier loop and through said loop to point 18, by conductor 56 to and through winding 13 by conductor 57 to point 17 of the rectifier loop, and through said loop to point 24, by conductor 58 to conductor 52, and thence through the contactor winding to line $L^2$. In this connection it is to be noted that the rectifier loop provides for rectifying both half waves of alternating current to supply unidirectional current to the winding 13. Also it is to be noted that conductors 56 and 57 with the rectifier loop provide a path for the discharge of winding 13. The point 24 of the rectifier loop is connected to line $L^1$ by closure of either the push button switch 7 or the auxiliary contacts $6^a$ of contactor 6. The connection extends from point 24, by conductors 58 and 52 through the relay contacts 10 and 11 when bridged, by conductor 51 through push button switch 7 to line $L^1$, or alternatively by conductors 51 and 54 through contacts $6^a$ to line $L^1$. Thus both short circuits extend through relay contacts 10 and 11, and upon response of said relay the rectifier loop is again rendered effective to supply current to the restraining winding 13 preparatory to repeating the welding cycle upon release of the relay as hereinbefore explained. Upon automatic repeating the relay 8 reestablishes the short circuit to render the restraining winding 13 again ineffective subject to its inductive time element.

With the selector device in the position illustrated the energizing circuit of the relay holding winding 14 may be traced from line $L^1$ through switch 39, by conductor 60 to point 38 of the lower rectifier loop, and thence through said loop to point 30 by conductor 61 through switch 43 by conductor 62 through the rheostat 44, by conductor 63 to and through winding 14, by conductor 64 to the rectifier loop at point 31, thence through said loop to point 36, and through resistance 37 to line $L^2$. In this connection it is to be noted that this rectifier loop provides for rectifying both half waves of alternating current for supply of unidirectional current to winding 14. The short circuit for this lower rectifier loop extends from point 38 of said loop by conductors 60 and 65 through switch 42, by conductor 66, through relay contacts 15 and 16 when bridged, by conductor 67 to point 36 of said loop. Conductors 63 and 64 together with the rectifier loop constitute a discharge circuit for the winding 14, said discharge circuit including only a portion of the resistance of the rheostat 44 with switch 43 closed.

With the selector positioned for engagement of contact arm 39 with contact 41 the direct connection between the lower rectifier loop and line $L^1$ is interrupted. On the other hand, upon closure of push button switch 7 a circuit is completed from line L¹ through said switch, by conductor 68 to and through switch arm 39 to the rectifying loop at point 38, and when contactor 6 responds its auxiliary contacts 6ª parallel the switch 7 to maintain the connection described. With the switch 42 open the aforedescribed short circuit for the lower rectifier loop is interrupted, and with the switch 43 open the discharge current of winding 14 is forced to traverse all of the resistor of rheostat 44, which resistor has its left hand terminal connected by conductors 69 and 61 to the rectifier loop at point 30.

Thus by setting the selector in the position illustrated a welding cycle may be effected by depressing push button switch 7 and if this switch is held depressed the relay 8 will effect automatically repetition of the welding cycle pending release of switch 7. If, on the other hand, the selector device is shifted to its other extreme position depression of the push button switch 7 will effect only a single welding cycle, the relay 8 functioning to prevent repetition pending release of switch 7. In either case when a welding cycle is initiated it will continue to completion even though the push button switch 7 is released due to the establishment by contactor 6 of a maintaining circuit for itself. Also in either case the relay 8 provides for definite "on" timing, whereas said relay provides for definite "off" timing in the case of automatic repetition, the timing means being of the inductive time limit type.

What I claim as new and desire to secure by Letters Patent is:

1. In a controller for an electric circuit, in combination, an electroresponsive device, means operative to effect completion of said circuit but only when said device is in a given position, said device having an operating winding included in the controlled circuit and further having a holding winding and a restraining winding, a loop containing rectifier elements and having connections with an alternating current supply and connections to said restraining winding, a shunt circuit for said loop and a circuit for said holding winding, the last two mentioned circuits being completed by said means each time the latter is operated to complete the controlled circuit.

2. In a controller for an electric circuit, in combination, an electroresponsive contactor for said circuit, a manual switch, a relay having an operating winding and a restraining winding, said operating winding to be included in said circuit, a loop containing rectifier elements, said loop having alternating current supply connections and connections to said restraining winding, an energizing circuit for said contactor extending through contacts of said relay and through said manual switch, a shunt circuit for said rectifier loop extending through said manual switch and connections completed by said contactor upon response thereof to maintain the aforementioned circuits independently of said manual switch.

3. In a controller for an electric circuit, in combination, an electroresponsive contactor for said circuit, a manual switch, a relay having an operating winding, a holding winding and a restraining winding, said operating winding to be included in said circuit, a loop containing rectifier elements, said loop having alternating current supply connections and connections to said restraining winding, an energizing circuit for said contactor extending through contacts of said relay and through said manual switch, a shunt circuit for said rectifier loop extending through said manual switch, connections completed by said contactor upon response thereof to maintain said circuits independently of said manual switch and a circuit for the holding winding of said relay extending through said manual switch.

4. In a controller for an electric circuit, in combination, an electroresponsive contactor for said circuit, a manual switch, and an electroresponsive device, said contactor being operable to complete said circuit but only when said device is in a given position, said device having a winding tending upon each completion of said circuit to move it to another position to effect interruption of said circuit and having means to restrain it temporarily against movement to such other position, said restraining means comprising a restraining winding and a discharge loop therefor rendered effective each time said switch is operated to effect completion of said circuit, and said device further having means to render it operable repeatedly to effect repeated cycles of operation of said switch if said manual switch when operated is retained in operated position.

5. In a controller for an electric circuit, in combination, a manual switch, an electroresponsive device and means to effect completion of said circuit but only when said manual switch and said device are in given positions, said device having a winding tending to move it to another position each time said circuit is completed thereby to effect interruption of said circuit and having means to restrain it temporarily against movement to such other position, said restraining means comprising a restraining winding normally supplied from an alternating current source through rectifier elements connected in a loop, said loop being short-circuited each time said circuit is completed but affording a discharge path for said restraining winding, and said device further having means to render it operable repeatedly to effect repeated cycles of operation of said means controlled thereby if said manual switch when operated is retained in operated position.

6. In a controller for an electric circuit, in combination, an electroresponsive device, a manual switch, means for effecting completion of said circuit but only when said manual switch and said device are in given positions, said device having operating and restraining windings, a loop containing rectifier elements through which said restraining winding is supplied with unidirectional current from an alternating current source and through which extends a discharge path for said restraining winding, a shunt for said loop controlled by said means, said means when completing said circuit also completing said shunt of said rectifier loop to terminate the supply of current to said restraining winding, said device tending upon each circuit closing operation of said means to move to another position to effect interruption of said circuit but being temporarily delayed in so operating by said restraining winding as a function of self-excitation of the latter, and said device further having means to render it operable repeatedly to effect repeated cycles of operation of said means controlled thereby if said manual switch when operated is retained in operated position.

7. In a controller for an electric circuit, in combination, an electroresponsive device, a manual switch, means operative to effect completion of said circuit but only when said manual switch and said device are in given positions, said device having an operating winding included in the controlled circuit and a holding winding and a restraining winding, a loop containing rectifier elements and having connections with an alternating current supply and connections to said restraining winding, a shunt circuit for said loop and a circuit for said holding winding, the last two mentioned circuits being completed by said means each time the latter is operated to complete the controlled circuit, and said device further having means to render it operable repeatedly to effect repeated cycles of operation of said means controlled thereby if said manual switch when operated is retained in operated position.

8. In a controller for an electric circuit, in combination, an electroresponsive contactor for said circuit, a manual switch, a relay having an operating winding and a restraining winding, said operating winding to be included in the controlled circuit, a loop containing rectifier elements, said loop having alternating current supply connections and connections to said restraining winding, an energizing circuit for said contactor extending through contacts of such relay and through said manual switch, a shunt circuit for said rectifier loop extending through said manual switch and connections completed by said contactor upon response thereof to maintain the aforementioned circuits independently of said manual switch, said relay further having means to render it operable repeatedly to effect repeated cycles of operation of said contactor if said manual switch when operated is retained in operated position.

9. In a controller for an electric circuit, in combination, an electroresponsive contactor for said circuit, a manual switch, a relay having an operating winding, a holding winding and a restraining winding, said operating winding to be included in the controlled circuit, a loop containing rectifier elements, said loop having alternating current supply connections and connections to said restraining winding, an energizing circuit for said contactor extending through contacts of said relay and through said manual switch, a shunt circuit for said rectifier loop extending through said manual switch, connections completed by said contactor upon response thereof to maintain said circuits independently of said manual switch, a circuit for the holding winding of said relay extending through said manual switch, said relay further having means to render it operable repeatedly to effect repeated cycles of operation of said contactor if said manual switch when operated is retained in operated position.

CARROLL STANSBURY.